United States Patent [19]
Yonge, III

[11] Patent Number: 6,074,086
[45] Date of Patent: Jun. 13, 2000

[54] SYNCHRONIZATION OF OFDM SIGNALS WITH IMPROVED WINDOWING

[75] Inventor: Lawrence W. Yonge, III, Ocala, Fla.

[73] Assignee: Intellon Corporation, Ocala, Fla.

[21] Appl. No.: 09/300,752

[22] Filed: Apr. 26, 1999

[51] Int. Cl.[7] .......................... H04L 25/36; H04L 25/40; H04L 7/00
[52] U.S. Cl. ........................ 371/343; 375/260; 375/343
[58] Field of Search .................................. 375/256, 260, 375/343, 226, 371

[56] References Cited

U.S. PATENT DOCUMENTS

| | | | |
|---|---|---|---|
| 4,057,762 | 11/1977 | Namiki | 375/376 |
| 4,438,511 | 3/1984 | Baran | 370/19 |
| 5,282,222 | 1/1994 | Fattouche et al. | 375/1 |
| 5,444,697 | 8/1995 | Leung et al. | 370/19 |
| 5,450,456 | 9/1995 | Mueller | 375/224 |
| 5,471,464 | 11/1995 | Ikeda | 370/19 |
| 5,488,632 | 1/1996 | Mason et al. | 375/260 |
| 5,506,836 | 4/1996 | Ikeda et al. | 370/19 |
| 5,546,429 | 8/1996 | Chiasson et al. | 375/341 |
| 5,550,812 | 8/1996 | Philips | 370/19 |
| 5,555,268 | 9/1996 | Fattouche et al. | 375/206 |
| 5,559,833 | 9/1996 | Hayet | 375/259 |
| 5,596,582 | 1/1997 | Sato et al. | 370/509 |
| 5,596,604 | 1/1997 | Cioffi et al. | 345/260 |
| 5,602,835 | 2/1997 | Seki et al. | 370/206 |
| 5,608,764 | 3/1997 | Sugita et al. | 375/344 |
| 5,610,908 | 3/1997 | Shelswell et al. | 370/210 |
| 5,627,863 | 5/1997 | Aslanis et al. | 375/357 |
| 5,636,224 | 6/1997 | Voith et al. | 371/2.1 |
| 5,652,772 | 7/1997 | Isaksson et al. | 375/367 |
| 5,682,376 | 10/1997 | Hayashino et al. | 370/206 |
| 5,694,389 | 12/1997 | Seki et al. | 370/208 |
| 5,726,973 | 3/1998 | Isaksson | 370/203 |
| 5,732,113 | 3/1998 | Schmidl et al. | 375/355 |
| 5,774,450 | 6/1998 | Harada et al. | 370/206 |
| 5,802,117 | 9/1998 | Ghosh | 375/344 |
| 5,812,523 | 9/1998 | Isaksson et al. | 370/208 |
| 5,889,759 | 3/1999 | McGibney | 370/207 |
| 5,901,180 | 5/1999 | Aslanis et al. | 375/261 |
| 5,914,931 | 6/1999 | Kang et al. | 370/203 |

OTHER PUBLICATIONS

Cioffi et al., "Very–High–Speed Digital Subscriber Lines," IEEE Communications Magazine, vol. 37, No. 4, pp. 72–79 (Apr. 1999).
Edfors et al., "An introduction to orthogonal frequency–division multiplexing," (Sep. 1996).
Sandell et al., "Timing and Frequency Synchronization in OFDM Systems Using the Cyclic Prefix," Div. of Signal Processing, Lulea Univ. of Tech., S–971 87, Lulea, Sweden (no date).
Schmidl et al., "Robust Frequency and Timing Synchronization for OFDM," IEEE Trans. on Communication, vol. 45, No. 12, pp. 1613–1621 (Dec. 1997).
Synchronization Bursts—Chapter 4, http:\\www.sce.carleton.ca/~Laszlo.Hazy/OFDM/bursts.html (Sep. 23, 1998).
van der Beek et al., "Low–Complex Frame Synchronization in OFDM Systems," Div. of Signal Processing, Lulea Univ. of Technology, S–971 87, Lulea, Sweden (1995).
van der Beek et al., "On Synchronization in OFDM Systems Using the Cyclic Prefix," Div. of Signal Processing, Lulea Univ. of Technology, S–971 87, Lulea, Sweden (no date).

*Primary Examiner*—Don N. Vo
*Assistant Examiner*—Phuong Phu
*Attorney, Agent, or Firm*—Fish & Richardson P.C.

[57] ABSTRACT

A mechanism for determining phases of a symbol for phase correlation is provided. The mechanism performs a symmetric apodizing window function on a symbol sample of a symbol having a symbol period of T and a time-offset symbol symbol sample offset from the symbol sample by T/2 to produce first windowed values for the symbol sample and second windowed values for the time-offset symbol sample. The mechanism applies a time shift to re-align the time-offset symbol sample with the symbol sample and sums the second windowed values and the corresponding first windowed values. The summed values are then converted to phases. The symmetric apodizing window function is an apodizing window function having the property $W_j + W_{(FFTSize/2+j)} = $ constant, where FFTSize is the size of the FFT sample. The symmetric apodizing window function, such as a Hanning window, may be performed in the time or frequency domain.

16 Claims, 19 Drawing Sheets

20•log: (|OFDMfreqSample$_f$|+10$^{-10}$)
20•log: (|Amp_OrigData$_f$|+10$^{-10}$)

Ph_OFDMsample$_c$
Ph_OrigData$_{c-CarrStart}$

FIGURE 14A $$W1\_OFDMfreqSample := \begin{vmatrix} \text{for } w \in 0 .. 0.5 \cdot \text{FFTsize} - 1 \\ \begin{vmatrix} \text{OFDMSample}_{w+0.5 \cdot \text{FFTsize}} \leftarrow \text{OFDMwfm}_{(\text{SymPtr} - 0.5 \cdot \text{FFTsize}) + w} \cdot \text{HanningWinTime}_w \ldots \\ + \text{OFDMwfm}_{\text{SymPtr} + 0.5 \cdot \text{FFTsize} + w} \cdot \text{HanningWinTime}_{w + 0.5 \cdot \text{FFTsize}} \\ \text{OFDMSample}_w \leftarrow \text{OFDMwfm}_{\text{SymPtr} + w} \end{vmatrix} \\ \text{FFT(OFDMSample)} \end{vmatrix}$$

FIGURE 14B

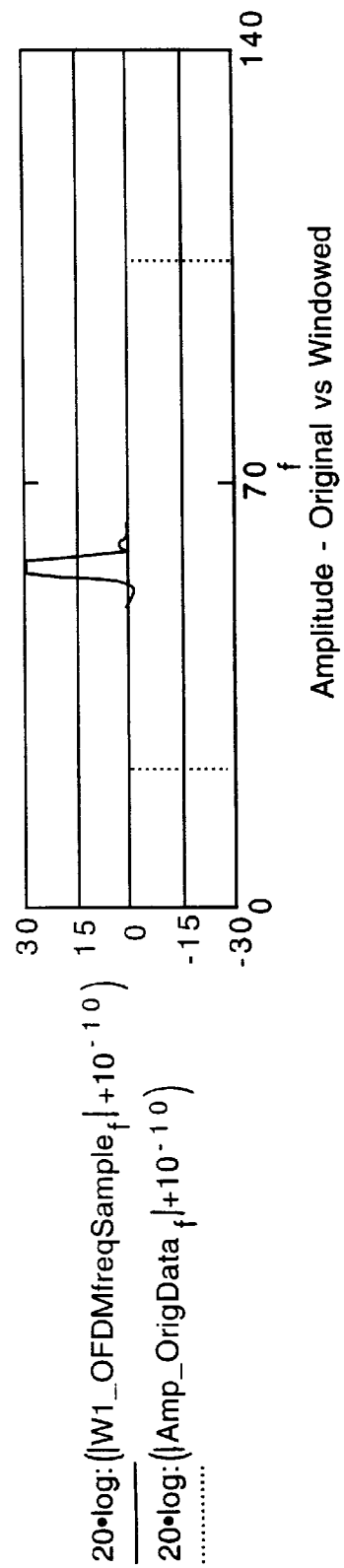

$20 \cdot \log \cdot (|W1\_OFDMfreqSample_f| + 10^{-10})$
$\overline{20 \cdot \log \cdot (|Amp\_OrigData_f| + 10^{-10})}$ Amplitude - Original vs Windowed

FIGURE 15A $W2\_OFDMfreqSample := \begin{vmatrix} F1 \leftarrow FFT(submatrix(OFDMwfm, SymPtr - 0.5 \cdot FFTsize, SymPtr + 0.5 \cdot FFTsize - 1, 0, 0)) \\ F2 \leftarrow FFT(submatrix(OFDMwfm, SymPtr, SymPtr + FFTsize - 1, 0, 0)) \\ F1 \leftarrow FreqHanning(F1) \\ F2 \leftarrow FreqHanning(F2) \\ \text{for } n \in 1, 3 .. 0.5 \cdot FFTsize \\ \quad F1_n \leftarrow -1 \cdot F1_n \\ F1 + F2 \end{vmatrix}$

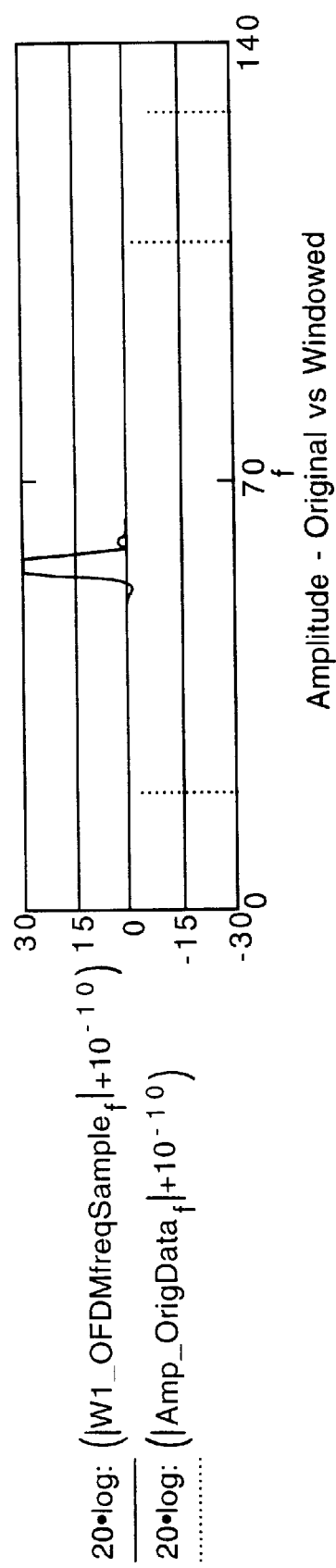

FIGURE 15B $20 \cdot \log: (|W1\_OFDMfreqSample_f| + 10^{-10})$
$\overline{20 \cdot \log: (|Amp\_OrigData_f| + 10^{-10})}$ Amplitude - Original vs Windowed

SYNCHRONIZATION OF OFDM SIGNALS WITH IMPROVED WINDOWING

BACKGROUND OF THE INVENTION

The present invention relates generally to broadband transmission of information and, more particularly, to time synchronization of a received OFDM signal.

Orthogonal Frequency Division Multiplexing (OFDM) is a spread spectrum technology wherein the available bandwidth is subdivided into a number of discrete channels or subcarriers that are overlapping and orthogonal to each other. Each channel has a well defined frequency. Data are transmitted in the form of symbols that encompass some number of subcarrier frequencies. The amplitude and/or phase of the subcarriers represents the encoded information. Before a received OFDM symbol can be decoded, frequency and time synchronization of the signal have to be determined. This process is referred to as synchronization.

Time synchronization may be achieved through the use of time-based correlation in the time domain or phase correlation in the frequency domain. Phase correlation has several advantages over time-based correlation. Phase correlation is more robust as it is significantly less affected by amplitude variations than time-based correlation. Also, symbols can be synchronized in the presence of a much stronger jammer by correlation in the frequency domain.

OFDM symbols can be synchronized in the frequency domain by correlating the phases of the carriers with the phases of a reference symbol. Alternatively, or in addition, autocorrelation can be performed by correlating the phases of a received symbol with those of an earlier received symbol.

Time synchronization of the received OFDM signals is more difficult to achieve, in particular, in the presence of narrow band interference in the OFDM channel. Apodizing window functions, such as Hanning windows, are typically used to deal with the effects of a narrowband interferer, such as a jammer signal, in samples that are passed to a phase correlator. While the apodizing window confines interference from the narrowband interferer to only several of the OFDM subcarriers, it introduces intercarrier interference into the subcarrier frequencies. The intercarrier interference can result in destructive canceling (i.e., frequency nulls") in transmitting subcarriers of equal amplitude and phase. In the presence of a frequency null, a phase correlator may miss a peak correlation pulse and thus provide unreliable synchronization. The intercarrier interference can also cause phase and amplitude distortion in each of the transmitted subcarriers processed by the apodizing window. Phase distortion in sample phases, as well as in the autocorrelation or reference phases with which they are compared, can result in poor phase correlation. Even using a best possible set of reference phases (typically, nonwindowed referenced phases), in conjunction with Hanning windowed phases reduces correlation by some factor. That is, it takes a much stronger signal to perform correlation than would be needed if a Hanning window was not used.

SUMMARY OF THE INVENTION

In one aspect of the invention, a method of determining phases of a symbol for phase correlation includes performing symmetric apodizing windowing function on a symbol sample having a symbol period of T and a time-offset symbol sample time-offset from the symbol sample by T/2 to produce first windowed values for the symbol sample and second windowed values for the time-offset symbol sample. The method further includes applying a time shift to re-align the time-offset symbol sample with the symbol sample and therefore align the second windowed values with corresponding first windowed values. The first and second windowed values are then summed together and the summing values are converted to phases. The symmetric apodizing window function is an apodizing window function W having the property $W_j+W_{(FFTSize/2+j)}$=constant, where FFTSize is the size of the FFT sample.

Embodiments of the invention may include one or more of the following features.

The symmetric apodizing window function may be performed in the time domain.

The symmetric apodizing window function may be performed in the frequency domain and may be applied to FFT frequency coefficients of the symbol sample and the time-offset symbol sample.

The symmetric apodizing window function may be a Hanning window.

The windowing scheme of the invention offers several advantages. It eliminates the effects of a "symmetric" apodizing window (e.g., Hanning window) on adjacent carriers, that is, the intercarrier interference. In addition, it provides the benefits of the Hanning window, such as improved jammer performance, without introducing phase and amplitude distortion into each of the carrier frequencies of a windowed signal. Such phase distortion can lead to poor phase correlation during synchronization.

BRIEF DESCRIPTION OF THE DRAWINGS

FIG. 14A is an illustration of the time domain based windowing process (of FIG. 10) as applied to the waveform (of FIG. 11) and FIGS. 14B–D are illustrations of the phases and amplitudes of the waveform demodulated after using the time-domain based windowing process of FIG. 14A; and FIG. 15A is an illustration of the frequency domain based windowing process (of FIG. 7) as applied to the waveform of FIG. 11. FIGS. 15B–D are illustrations of the phases and amplitudes of the waveform demodulated after using the frequency domain based windowing process of FIG. 15A.

DETAILED DESCRIPTION

In OFDM transmission, data are transmitted in the form of symbols. Each symbol has a predetermined time duration or symbol time $T_s$. Each symbol is comprised of N sinusoidal waveforms that are orthogonal to each other and form the OFDM channels and subcarriers. Each subcarrier has a frequency $f_i$ and a $\Phi_i$ measured from the beginning of the symbol. Orthogonality of the subcarriers requires that a whole number of periods of each waveform are contained within the symbol time $T_s$. The phases $\Phi_i$ and amplitudes $A_i$ of the waveforms can be set arbitrarily without affecting the orthogonality of the waveforms. The OFDM subcarriers occupy a frequency range between frequencies $f_1$ and $f_N$ referred to as OFDM bandwidth. Each subcarrier frequency fi has a uniform frequency $\Delta f$ from the adjacent subcarrier frequency $f_{i\pm 1}$. The $\Delta f$ is inversely proportional to the symbol time Ts.

Figure 1:
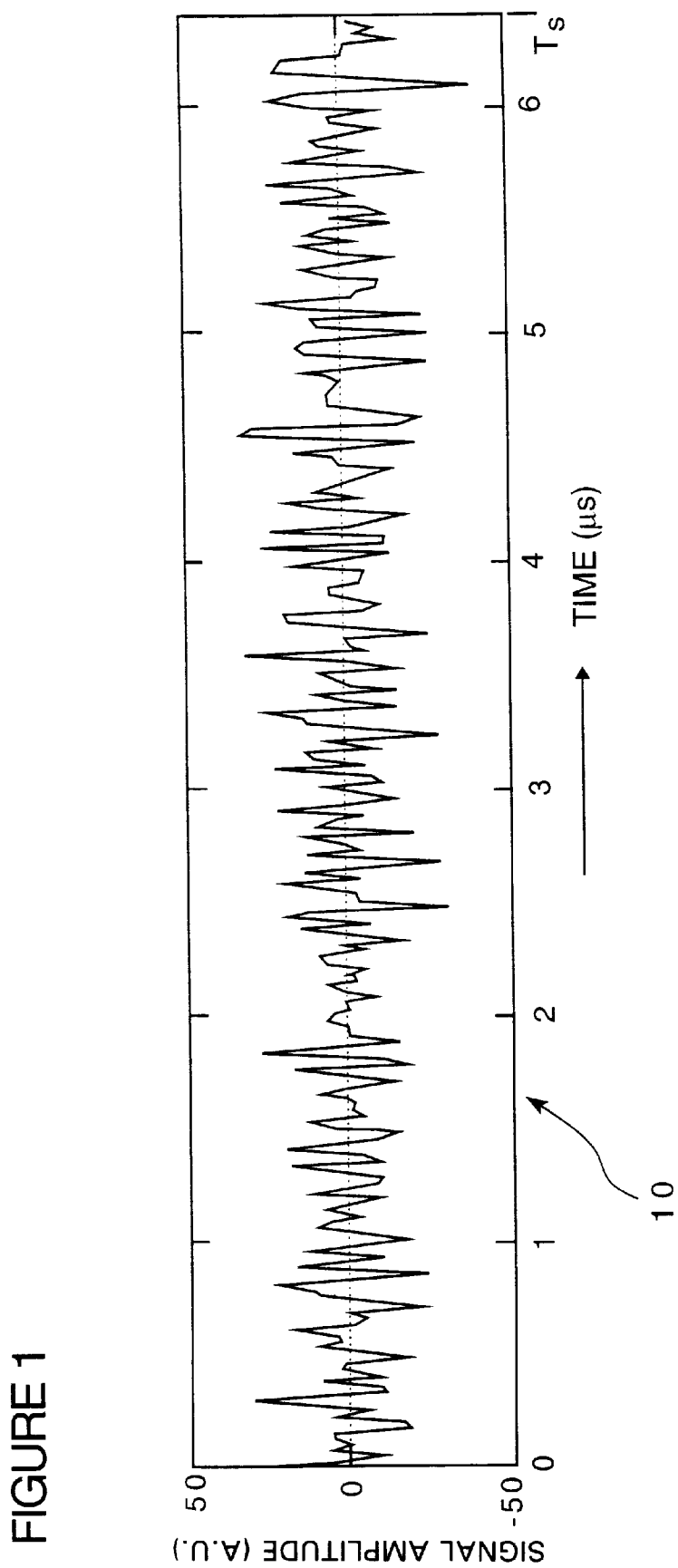
FIG. 1 is a temporal OFDM symbol.
Figure 2:
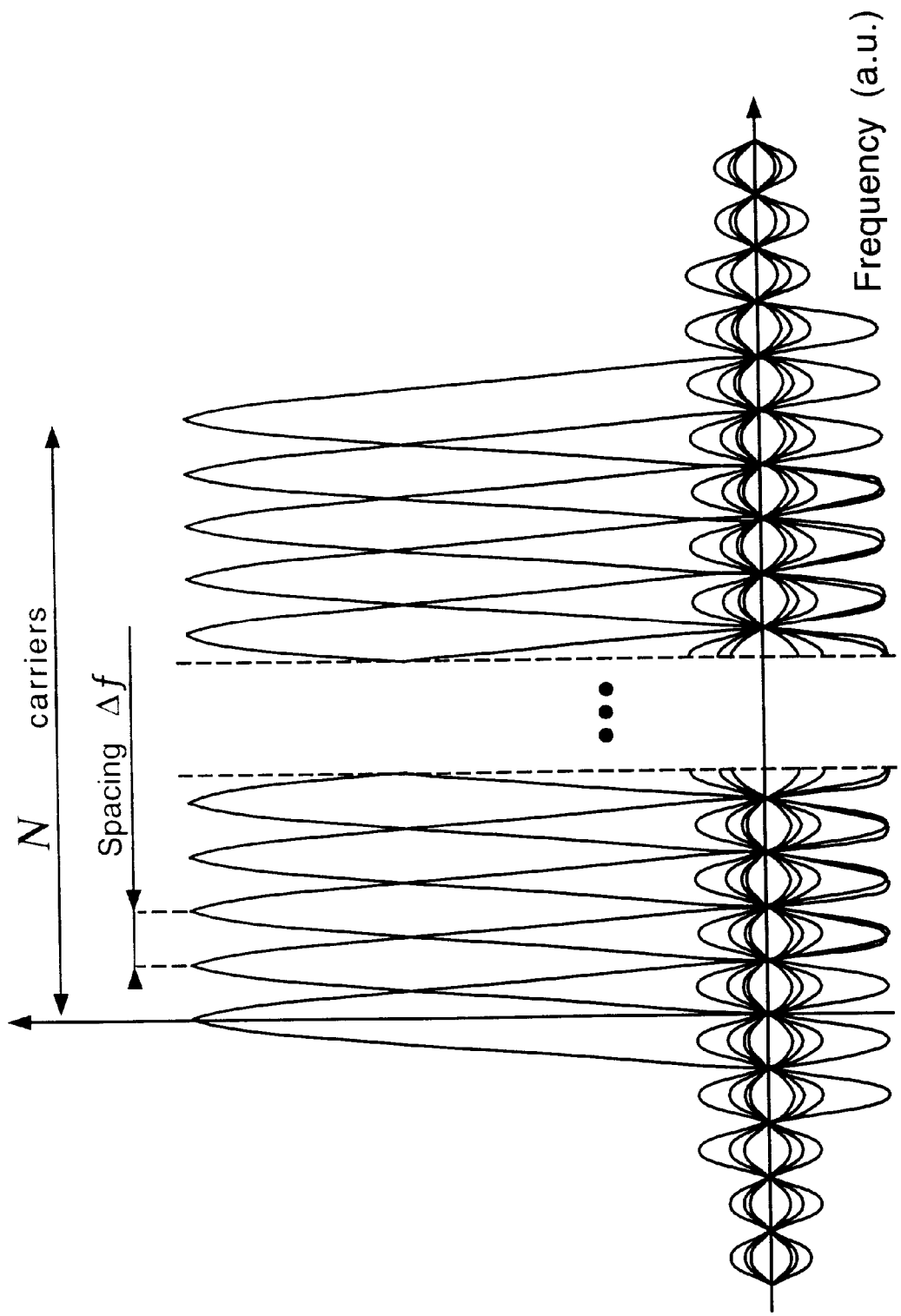
FIG. 2 illustrates symbolically a frequency distribution of OFDM channels.

Referring to FIGS. 1 and 2, an exemplary OFDM symbol 10 has a symbol time Ts of 6.4 us, which produces a channel spacing $\Delta f=1/6.4$ us=156.25 kHz. The symbol includes 84 subcarrier frequencies that are uniformly spaced between a first subcarrier frequency $f_1=3.594$ MHz and a last subcarrier frequency of $f_N=16.563$ MHz, corresponding to a system bandwidth of 13.125 MHz. In the example of FIG. 1, the phases of the 84 carriers are selected to be random and independent of each other. However, any other sets of phases may be selected. For the purpose of digital signal processing, the symbol is sampled during the symbol time $T_s$ at 256 sample points at a clock rate of 40 MHz. As mentioned above, the unmodulated amplitudes $A_i$ of each of the 84 OFDM channels are identical.

Figure 3:
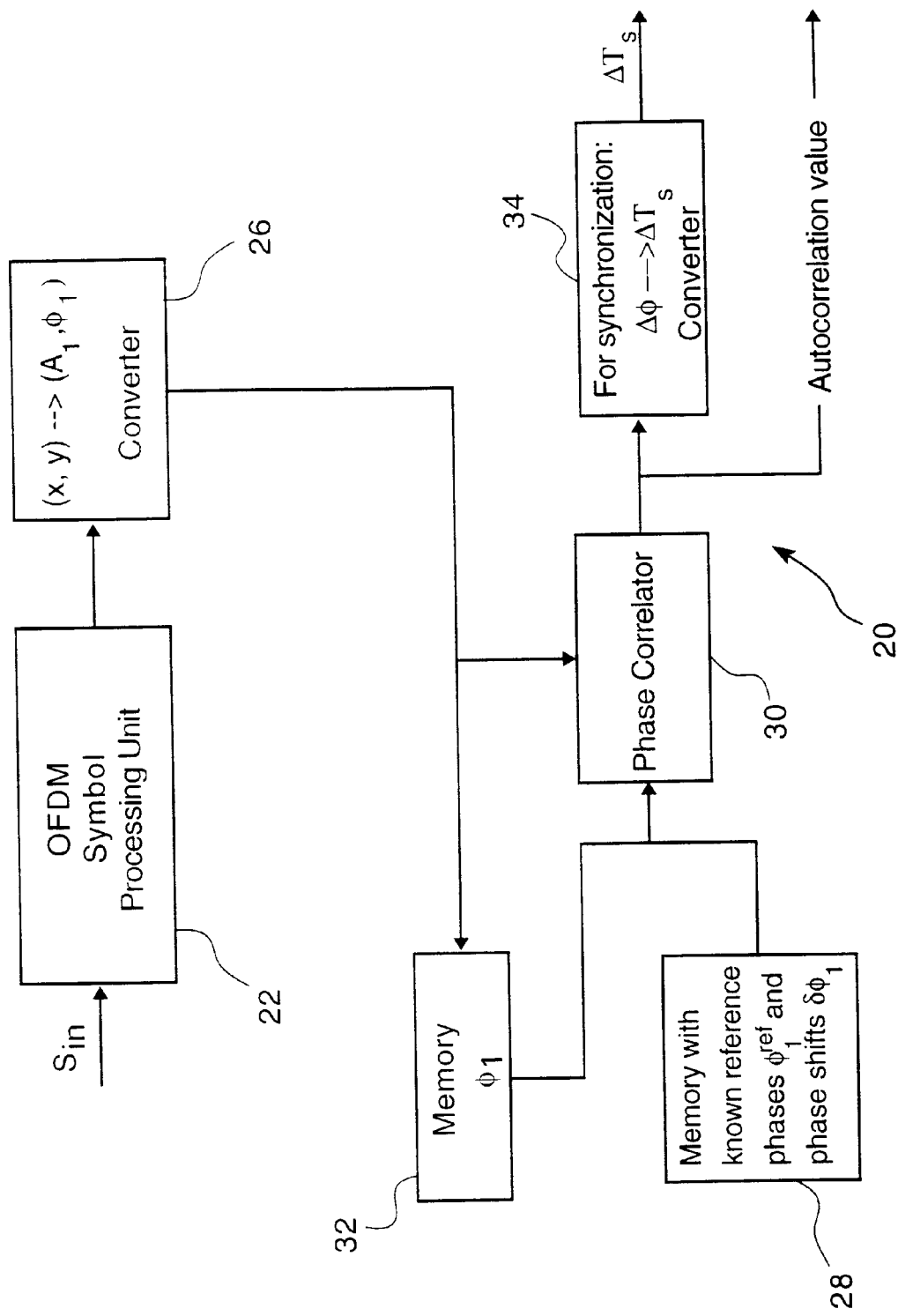
FIG. 3 is a schematic diagram of a phase correlator module including an OFDM symbol processing unit.

Referring now to FIG. 3, a phase correlator module 150 is shown. A temporal waveform $S_{in}$ is received by the phase correlator module 20 and is processed by an OFDM symbol processing unit (the unit) 22, which transforms the temporal waveform into the frequency domain. A first converter 26 converts the output of the unit 22 to respective amplitude values $A_i$ and phase values $\Phi_i$ at each of the OFDM subcarrier frequencies $f_i$. A phase correlator 30 is coupled to the first converter 26 and compares the phases $\Phi_i$ to known reference phases $\Phi_i^{ref}$ that may be stored in a reference phase memory 28, or to phases $\Phi_i$ of a processed symbol that was received earlier. The phases $\Phi_i$ of the earlier received, processed symbol may be stored in an autocorrelation phase memory 32 that may be identical to the reference phase memory 28. The phase correlator 30 then either compares the phases to produce an autocorrelation value indicating a repeating symbol pattern or aligns the phases with the reference phases. A second converter 34 computes from the aligned phases a corresponding time shift $\Delta t_s$, which represents the temporal shift between the received symbols and the reference, and is used for synchronization. The details of the phase correlator have been omitted for sake of clarity. Details of an exemplary phase correlator may be had with reference to copending U.S. application Ser. No. 09/234,289, in the name of Lawrence W. Yonge III.

Figure 4:
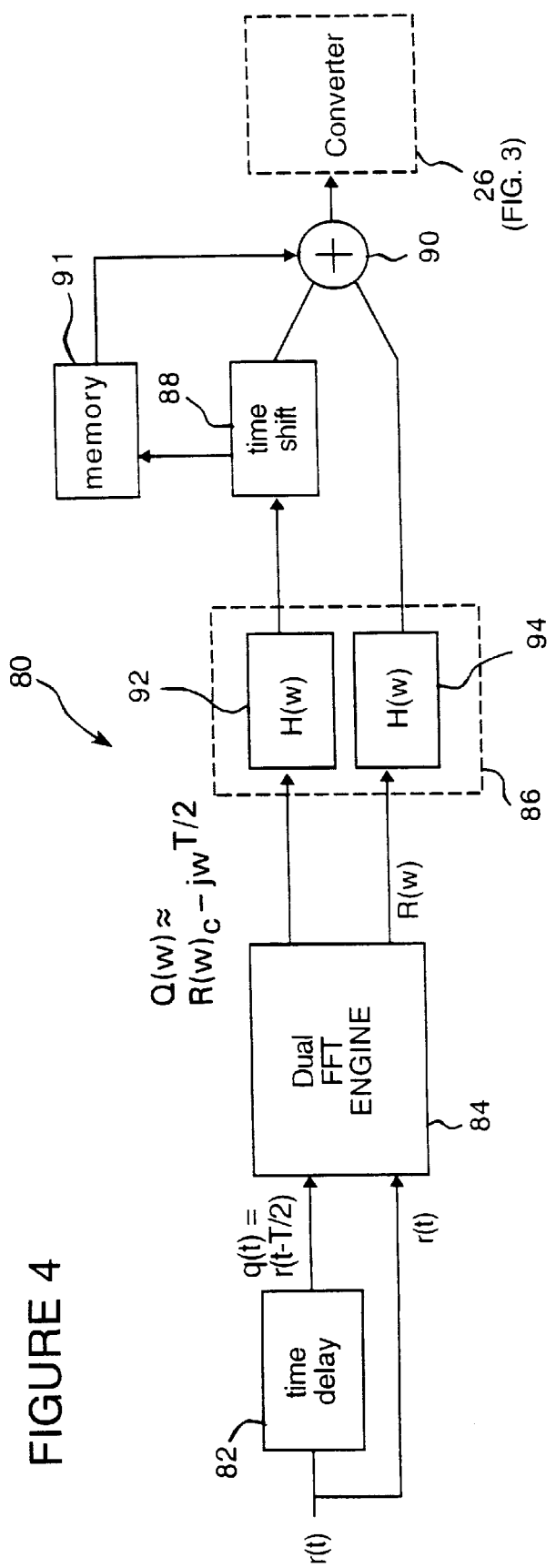
FIG. 4 is a block diagram of the OFDM symbol processing unit.

Referring to FIG. 4, the unit 22 (from FIG. 3) is shown. The unit 22 includes a time delay or offset element 82, a "dual" FFT engine 84, a window filter 86, a time shift element 88 and a summation unit (or "adder") 90. The output of the adder 90 is connected to the first converter 26 (of FIG. 3), shown in dashed lines. The window filter 86 includes a first Hanning window function 92 and a second Hanning function 94, as will be described later. The dual FFT module receives a sample of the original signal r(t) and a time-offset sample r(t–t.) offset by $t_o=T/2$. The dual FFT engine transforms the time-offset sample into first (time-offset) frequency coefficients $R(\omega)*e^{-j\omega t o}$ and transforms the original sample, that is, the non-offset sample, into second frequency coefficients $R(\omega)$. The frequency coefficients are processed by the window filter 86, which is selected as a "symmetric" apodizing window function. The symmetric apodizing window function is defined herein as an apodizing window function W having the property $W_j+W_{(FFTSize/2+j)}$=constant, where FFTSize is the size of the FFT sample.

In the illustrated embodiment, the symmetric apodizing window function (window filter 86) is the Hanning window, for which all values of j add up to one and thus has the aforementioned property. As shown in the figure, the first frequency coefficients are processed by the first Hanning window 92, and the second frequency coefficients are processed by the second Hanning window 94.

The processed first frequency coefficients are time-shifted to realign them with the corresponding processed second frequency coefficients. The time-shift re-alignment is achieved by multiplying the odd ones of the time-offset coefficients by –1, as will be described. The now realigned (processed) second frequency coefficients are added to their corresponding (processed) first frequency coefficients output by the second Hanning window and the resultant values are provided to the first converter 26 (of FIG. 3), which converts the values from rectangular to polar coordinates and transfers the phases of the polar coordinates to the phase correlator 30 (of FIG. 3), not shown. Optionally, the time shift element 88 is coupled to a memory 91, which stores copies of the windowed values shifted by the time shift element 88. These windowed values stored in the memory 91 may be retrieved and added to next windowed values output by the Hanning window function 94, and stored in the autocorrelation memory 30 (FIG. 3) for autocorrelation purposes, as later described.

Figure 5:
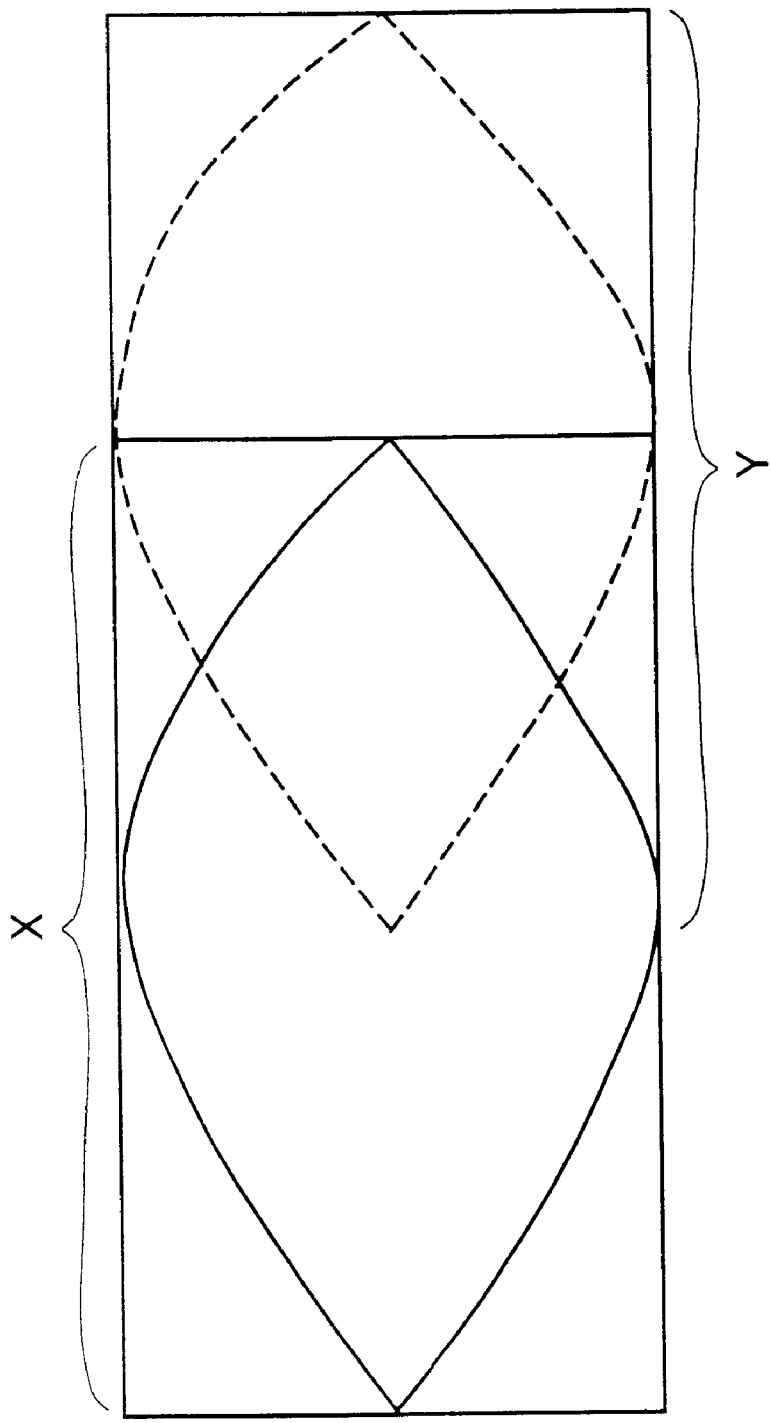
FIG. 5 is a depiction of a Hanning window applied to a symbol sample and the symbol sample with time-offset in the frequency domain.

Referring now to FIG. 5, a depiction of a sample and a time-offset version of the sample windowed in the frequency domain is shown. The windowed sample X (of a symbol having a symbol period T) is the convolution of the sample and the Hanning window function. Likewise, the windowed time-offset sample Y (offset by T/2) is the convolution of the time-offset sample and the Hanning window function. As shown in the figure, the time-offset sample includes a T/2 cyclic extension of X that is identical to the first half of X since synchronization symbols are repeating OFDM symbols.

The time shift relationship of r(t) in the time domain and $R(\omega)$ in the frequency domain can be expressed as follows:

$$r(t-t_o) => e^{-j\omega t o}R(\omega)$$

where $f=c*(1/T)$, $\omega=c*(2\pi/T)$ and $t_o=T/2$, then $$r(t - T/2) => e^{-jc(2\pi/T)T/2}R(\omega)$$
$$=> e^{jc\pi}R(\omega)$$
for even $c, e^{-jc\pi} = 1$
for odd $c, e^{-jc\pi} = -1$ It will be appreciated that the noise applied to $Q(\omega)$ (shown in FIG. 4) and $R(\omega)$ is different. However, it can be assumed that $Q(\omega)$ and $e^{-j\omega t_o}R(\omega)$ are approximately equal since $Q(\omega)$ is essentially a time-offset sample of $R(\omega)$.

Referring back to FIG. 4, the even ones of the time-offset frequency coefficients, referred to now as "$A_c$", are multiplied by +1 and the odd ones of the time-offset coefficients $A_c$ are multiplied by −1. For subcarrier frequencies $A_{23}$ through $A_{26}$, for example, the coefficients are represented as the following:

| non-offset | time-offset |
|---|---|
| $A_{23}$ | $-A_{23}$ |
| $A_{24}$ | $A_{24}$ |
| $A_{25}$ | $-A_{25}$ |
| $A_{26}$ | $A_{26}$ |

It may be recalled that the windowed frequency for a Hanning window is obtained by subtracting for each subcarrier one half the sum of the coefficients at the two adjacent carriers, i.e., $A_c - \frac{1}{2}(A_{c-1} + A_{c+1})$. Thus, for the carrier sample c=24, the Hanning window provides $A_{24} - \frac{1}{2}(A_{23} + A_{25})$ for the non-offset coefficient and $A_{24} + \frac{1}{2}(A_{23} + A_{25})$ for the time-offset coefficient.

For an odd carrier c=25, the Hanning window provides for the non-offset coefficient the Hanning value $A_{25} - \frac{1}{2}(A_{24} + A_{26})$ and for the time-offset coefficient the Hanning value $-A_{25} - \frac{1}{2}(A_{24} + A_{26})$. To realign the offset sample points back with the original sample, the odd carriers C are multiplied by −1. Thus, in this example, the time-offset frequency coefficient becomes $A_{25} + \frac{1}{2}(A_{24} + A_{26})$ and the resulting Hanning values for each of the sample points are added. The sum is $2A_{24}$ for c=24 and $2A_{25}$ for c=25. Thus, it can be seen that the components of the adjacent signals typically found in each carrier signal after a Hanning window function are removed.

The single-unit dual FFT engine shown in FIG. 4 may be implemented using a dual FFT engine which was designed to complex signals. Rather than setting the imaginary parts of the complex entries to zero, a use which results in redundancy and does not utilize the full bandwidth of the engine, the complex FFT engine can be fully utilized by applying real numbers at both the real and imaginery inputs. This makes use of the fact that the real part of the frequency spectrum of a real signal is an even function and the imaginery part of the frequency spectrum of a real signal is an odd function. The practice of performing dual-real transforms with complex FFTs is well-known and, therefore, will not be described in further detail. Of course, it will be recognized that the dual FFT engine 84 can also be implemented as two separate FFT engines.

Figure 6:
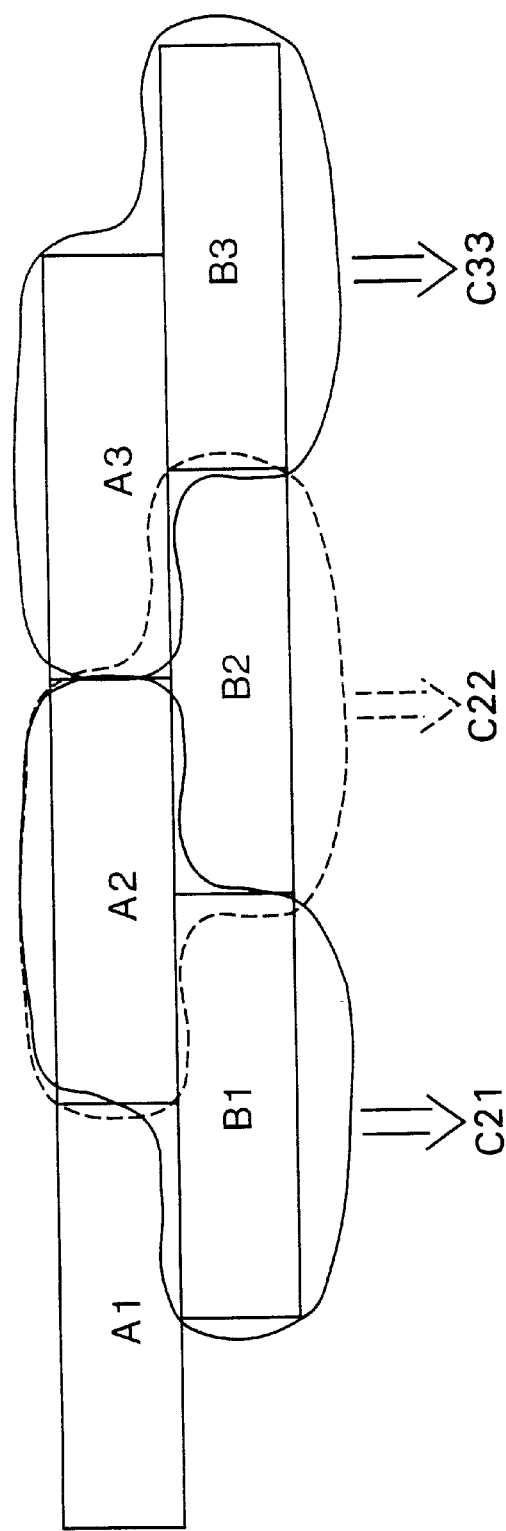
FIG. 6 is a depiction of autocorrelation between samples processed by the OFDM symbol processing unit of FIG. 4.

Referring now to FIG. 6, a plurality of samples A1, A2 and A3 and their corresponding time-offset samples B1, B2 and B3 are shown. Assuming each sample is 256 points, each time-offset sample is forward-shifted by 128 points. If A3 is the current sample being processed by the unit 22 (of FIG. 4) and the output of the unit 22 is sample C33, the output C33 is sent to the phase correlator 30 for comparison with reference phases as described above. Alternatively, C33 is "autocorrelated" with an earlier sample C22. Because there is a signal portion common to C33 and C22, the resulting autocorrelation value may be slightly biased towards correlation. Thus, to eliminate such bias (however slight), an alternative autocorrelation may be achieved by comparing C33 to C21. This is accomplished by storing each time-offset windowed sample output by the time shift element 88 (of FIG. 4) and subsequently combining that stored sample with a next non-offset windowed sample, that is, the non-offset windowed sample for the next symbol that is processed. The resulting sum is stored in the autocorrelation memory 30. When the following symbol is processed, the stored sum is used for autocorrelation. Thus, with reference to the example shown in FIG. 6, when C22 is output by the unit 22 (of FIG. 4), C21 is computed by retrieving B1 from the memory 91 (of FIG. 4). When C33 is subsequently output by the unit 22, it is correlated with C21 to produce an autocorrelation value.

Figure 7:
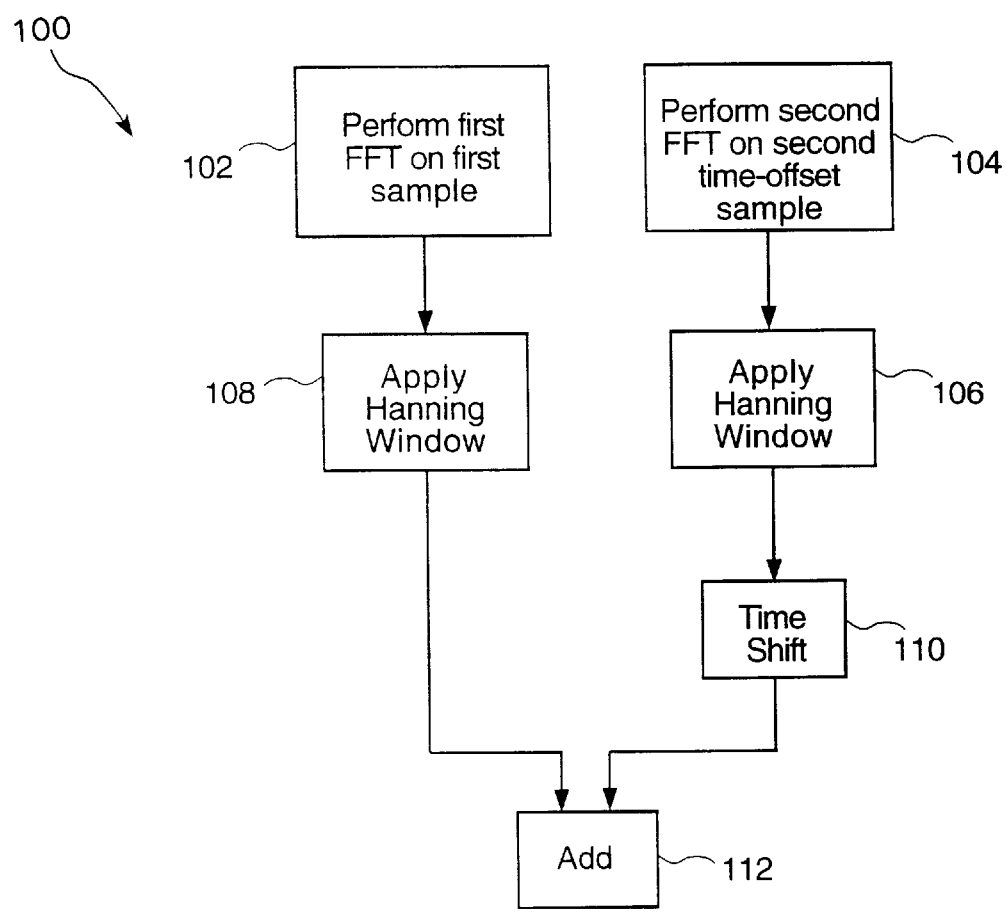
FIG. 7 is a flow diagram of a frequency domain based windowing process performed by the OFDM symbol processing unit of FIG. 4.

Referring to FIG. 7, a frequency domain windowing process (100) performed by the receiver 80 of FIG. 14 is shown. The process performs (102) a first FFT on a first sample of a temporal symbol waveform sampled at a number (s) of sample points, e.g., s=256 sample points, during the symbol time $T_s$. The process performs (104) a second FFT on a second sample that is time-offset from the first sample by a time=T/2. The process applies (106) the first Hanning window to the second (time-offset) sample and applies (108) the second Hanning window to the first sample in the frequency domain. The processed second sample is time-shifted 110 (i.e., the odd ones are multiplied by −1) to realign the second sample points with corresponding ones of the first sample points. The process then (112) adds the processed second sample points to the processed first sample points of the OFDM symbol.

Figure 8:
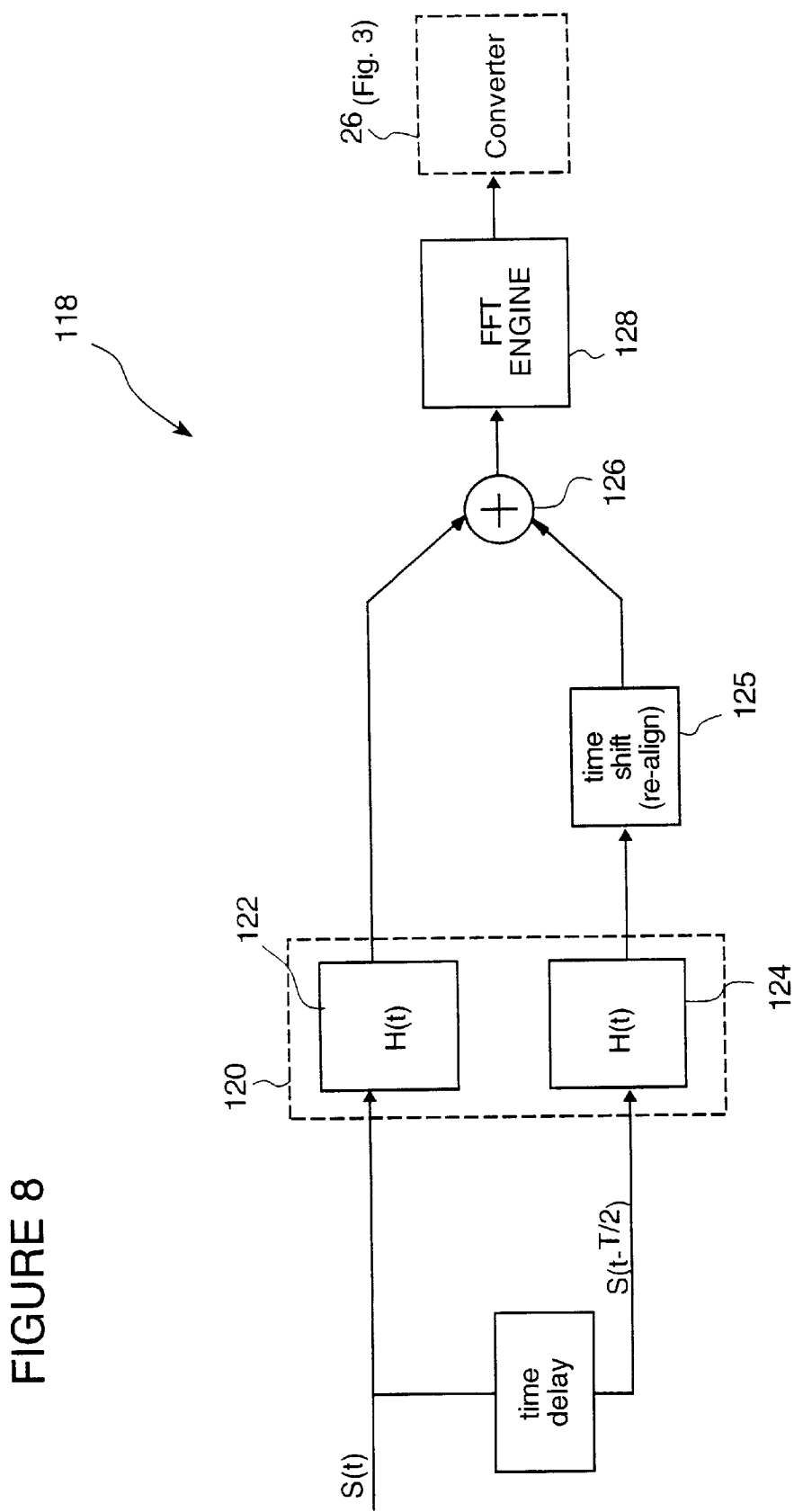
FIG. 8 is an alternative embodiment of the OFDM symbol processing unit of FIG. 3.

In an alternative embodiment of the OFDM symbol processing unit 22 (of FIG. 3), the Hanning window filter is placed before the FFT engine. Referring to FIG. 8, an OFDM processing unit 118 includes a Hanning window filter 120. The Hanning window filter includes a first Hanning window function 122 for receiving a waveform S(t) and a second Hanning window function 124 for receiving a time-offset waveform S(t-T/2) offset by T/2 by time delay element 119. The unit further includes a time shift element 125 for time-shifting (e.g., rotating) the windowed time-shifted waveform or sample into re-alignment with the windowed, non-offset waveform. Also included is an adder 126 coupled to one output of the Hanning window filter 120 and the time shift element 125, as well as the input of an FFT engine 128. The output of the FFT engine is received by the first converter 26 (from FIG. 3), which converts the output to phases and transfers the phases to the phase correlator 30 (FIG. 3), not shown.

It will be recognized that, like the frequency domain based approach described with reference to FIGS. 4–7, autocorrelation can be performed in much the same way as was described with reference to FIG. 6 so that any minimal effects of the common sample portion (as would be seen in any two consecutive outputs of the OFDM symbol processing unit 118) on the correlation are eliminated. However, as the time domain based approach normally uses a single FFT, the alternative autocorrelation would require the addition of a second FFT engine or a dual FFT engine (as is used in the illustrated frequency domain windowing process). Because the time domain based approach is already more computation intensive, the added complexity of the second FFT makes the frequency domain based approach a more practical solution if the alternative autocorrelation is to be used.

Figure 9A:
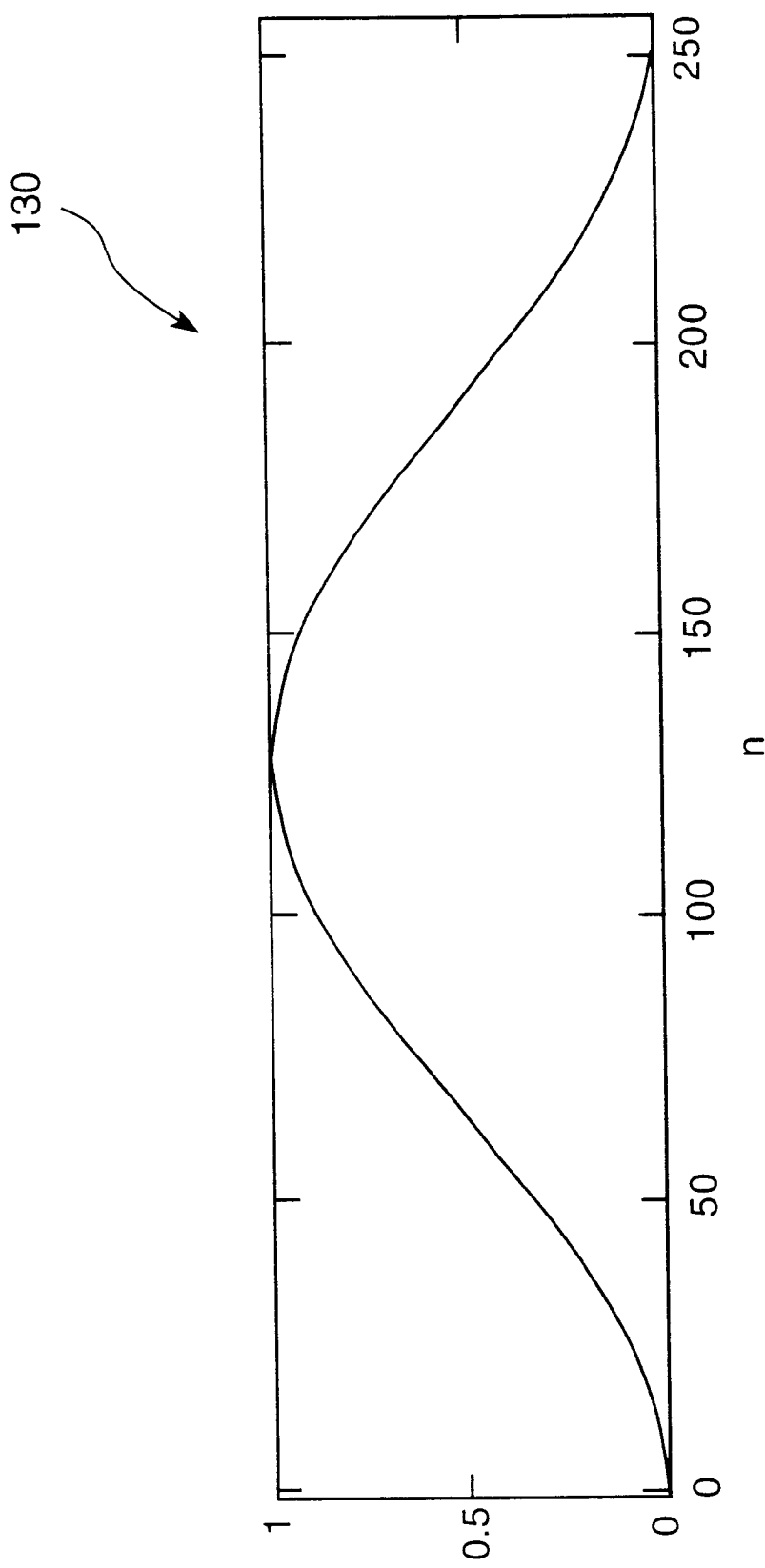
FIGS. 9A–C are depictions of a Hanning window applied to a symbol sample and the symbol sample with time-offset in the time domain.
Figure 9B:
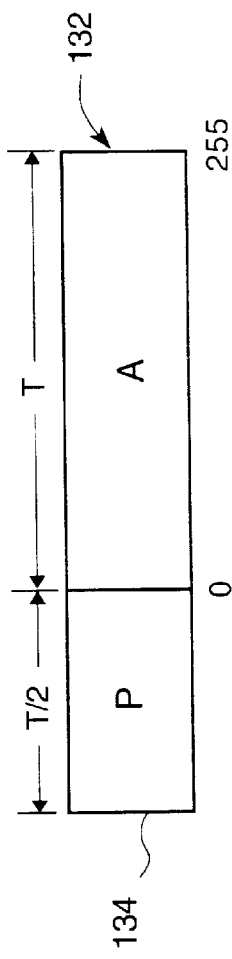
Figure 9C:
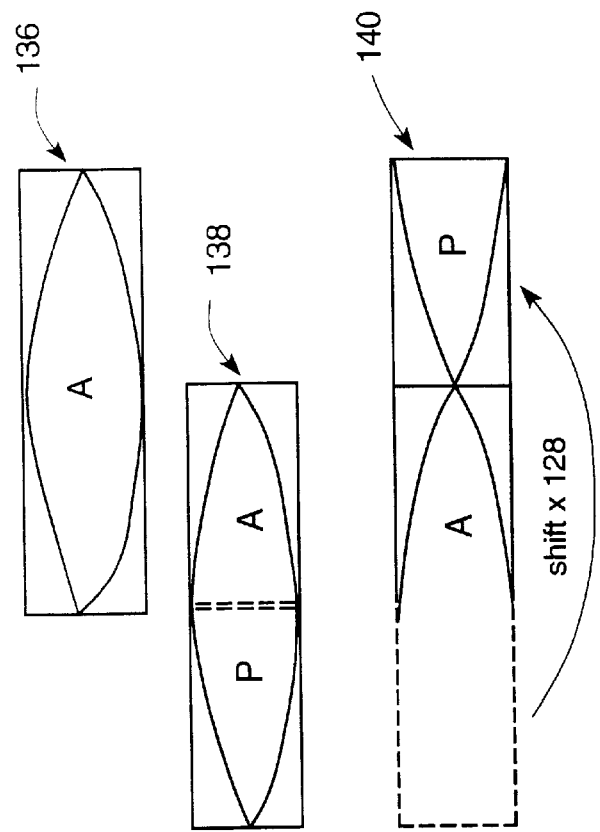

Referring now to FIGS. 9A–C, an example of the time-domain windowing process performed by the receiver 118 of FIG. 15 is shown. FIG. 9A illustrates a Hanning window H 130 containing 256 points: $H_0, H_1, H_2, H_3, \ldots, H_{255}$. The Hanning window 130 has the property $H_j = 1 - H_{128+j}$. FIG. 9B depicts an OFDM symbol 132 of a sample size (number of sample points) s=256: $A_0$ to $A_{255}$. The OFDM symbol has a cyclic extension (prefix) 134 $P_j = A_j$, j=128 to 255, in the originally transmitted signal. That is, prefix P is identical to the second half of A. The cyclic prefix P, together with the first half of the symbol A, thus represent a time-offset version of sample A. The time-offset sample is offset by T/2 (128 points, in this example). FIG. 9C shows a first Hanning window applied to sample A, that is, $(A_0-A_{255})*(H_0-H_{255})$, to give Hanning values $X_0-X_{255}$, collectively, windowed sample X 136. Further illustrated is a second Hanning window applied to the points $(P_{128}-A_{127})*(H_0-H_{255})$ to give Hanning values $(Y_0-Y_{255})$, collectively, windowed sample Y 138. Therefore, with reference to FIG. 8C, $X_j=A_j*H_j$, and for j=0 to 255, $Y_j=P_{j+128}*H_j$ and $Y_{j+128}=A_j*H_{j+128}$.

Referring again to FIG. 9C, to time align the two windowed samples $X_j$ and $Y_j$, $Y_{j+128}$, sample P is moved by 128 points (as indicated by the arrow). Thus, after the shift, $Y_0-Y_{255}$ is $Y_{128}, Y_{129}, \ldots Y_{255}, Y_0, Y_1, \ldots Y_{126}, Y_{127}$, collectively, Y 140. Combining the two samples X 136 and Y 140 gives $X_0+Y_{128}, X_1+Y_{129} \ldots X_{127}+Y_{255}, X_{128}+Y_0, X_{129}+Y_1 \ldots X_{254}+Y_{126}, X_{265}+Y_{127}$.

More specifically, for the first 128 points of the combined windowed samples (j=0 to 127):

$$X_j + Y_{j+128} = A_j * H_j + A_j * H_{j+128}$$
$$= A_j * [H_j + H_{j+128}]$$
$$= A_j * [H_j + 1 - H_j]$$
$$= A_j$$

For the second 128 points of the combined windowed samples X and Y (where j=0 to 127):

$$X_{j+128} + Y_j = A_{j+128} * H_{j+128} + P_{j+128} * H_j$$
$$= A_{j+128} * H_{j+128} + P_{j+128} * [1 - H_{j+128}]$$
$$\sim A_{j+128} * H_{j+128} + A_{j+128} * [1 - H_{j+128}]$$
$$\sim A_{j+128} * H_{j+128} + [1 - H_{j+128}]$$
$$\sim A_{j+128}$$

It should be noted that, because A and P are different signals and therefore noise and channel distortion are applied to each differently, there is actually a small but negligible difference between the two. Thus, $A_{j+128}$ is approximately equal to $P_{j+128}$ in the substitution above.

It will be recognized that, although a full Hanning window can be applied to both the original and the time-offset samples (as described above), the summing of the resultant Hanning values in samples X 136 and Y 140 for the 128 points of A which are common to both samples yields no more than the original sample Aj. Therefore, the same results could be achieved by applying a first half Hanning window ($H_0$ to $H_{127}$) to P and a second half Hanning window ($H_{128}$ to $H_{255}$) to the second half of A. The half Hanning window approach is less computationally intensive than the full Hanning window approach and is therefore a more desirable implementation.

Figure 10:
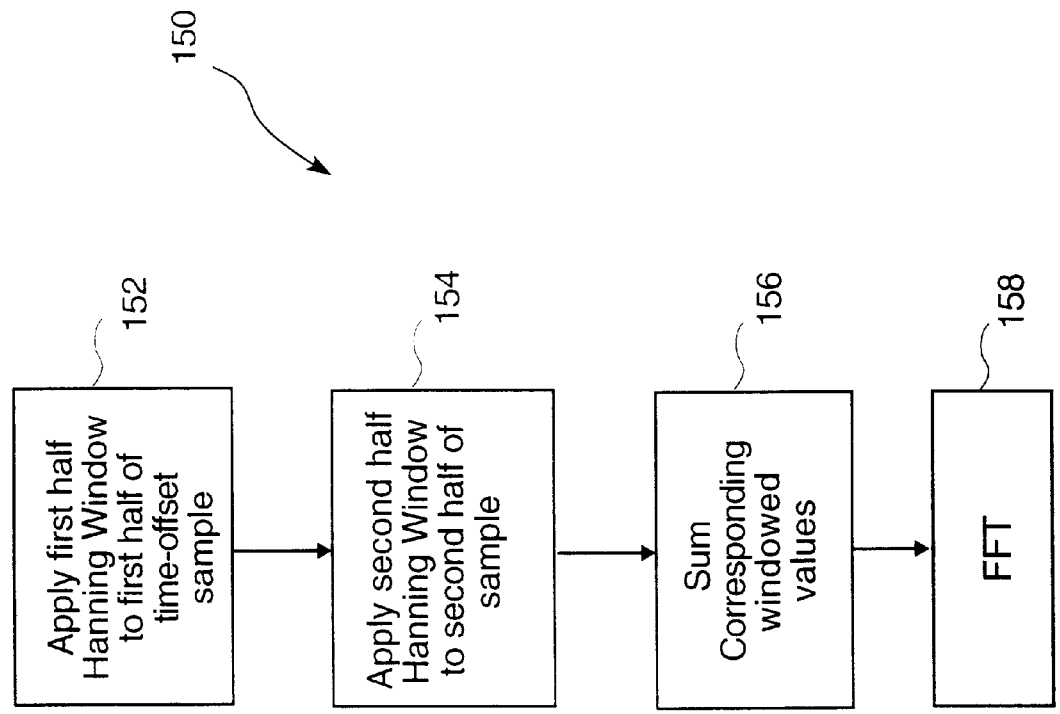
FIG. 10 is a time domain based windowing process performed by the OFDM symbol processing unit of FIG. 8.

Referring to FIG. 10, a time-domain based windowing process (140) performed by the OFDM symbol processing unit 118 shown in FIG. 8 (and depicted in the example of FIGS. 9B–C) is shown. The process applies (152) a first half of a Hanning window to the first half (e.g., points 0 to 127 in a 256 point sample) of a T/2 time-offset sample and applies (154) a second half of a Hanning window to the second half (e.g., points 128 to 256 in a 256 point sample) of a first, non-offset sample. The windowed values in the first sample are added (156) to corresponding windowed values in the second sample (i.e., values separated by T are added together). The summed values, along with the points in the first half of the first sample, are then Fourier-transformed (158) by a single FFT engine.

Thus, the Hanning window effectively limits the effect of a non-orthogonal narrowband interferer by tapering the endpoints of the signal smoothly to zero. Since the original signal is also distorted by the window, the realignment and combination of the signals restores the original signal without changing the benefit gain (reduction in effects of narrowband interferer) achieved by applying the window.

Figure 11:
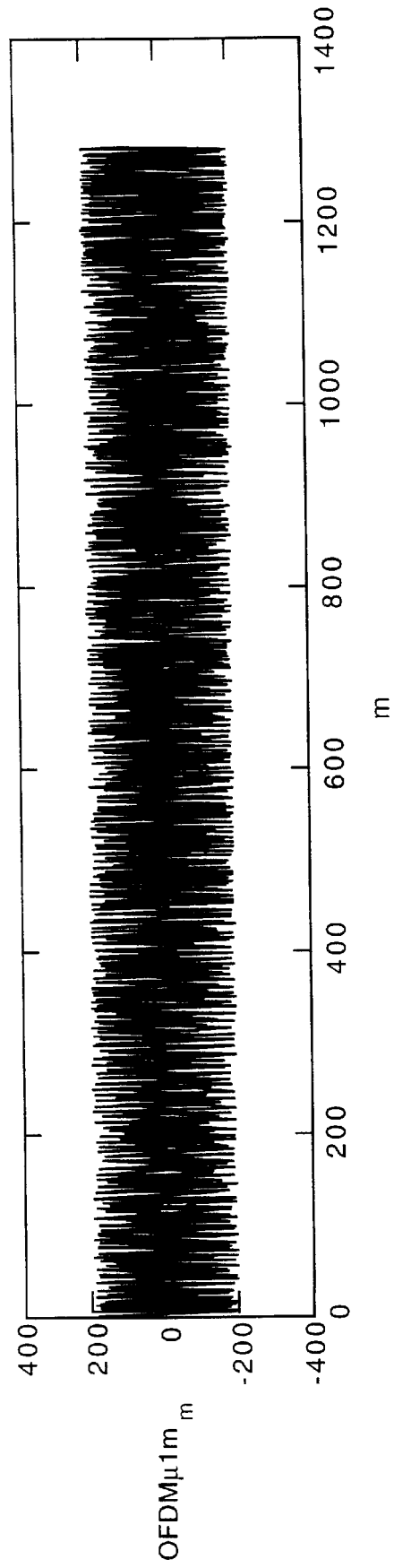
FIG. 11 is a depiction of a jammer signal superimposed on a temporal waveform including three consecutive symbols.

Collectively, FIGS. 11–15 illustrate advantages of employing the above-described time domain and frequency domain based windowing processes during phase correlation. Referring to FIG. 11, an exemplary temporal signal waveform is composed of three identical consecutive symbols. Added to the symbols is a jammer signal emitting an interfering signal at a single frequency $f_i$=55 MHz. In this example, the jammer-to-signal amplitude ratio is 20 dB. As seen in the figure, the jammer is the predominant signal.

Figure 12A:
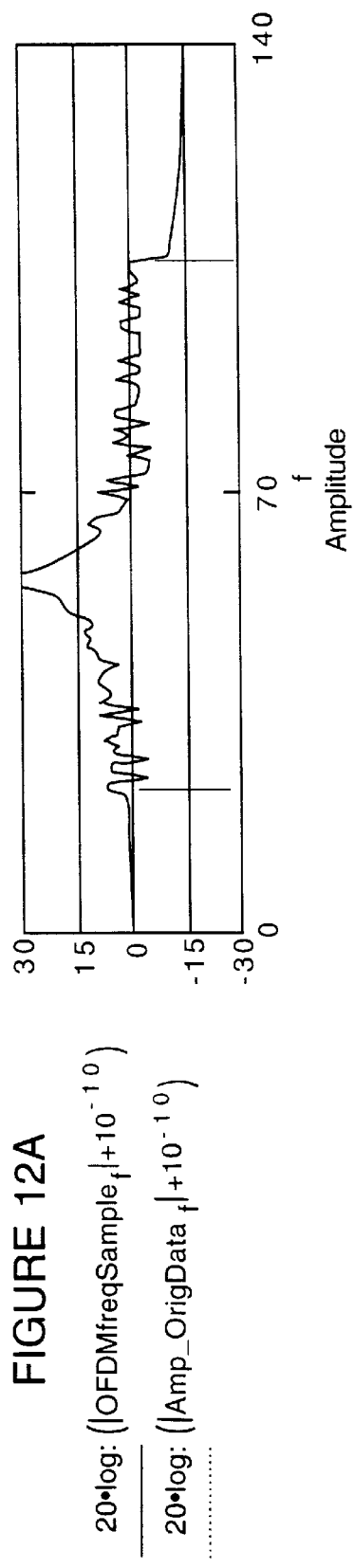
FIGS. 12A–C are illustrations of the phases and amplitudes of the waveform (of FIG. 11) demodulated without windowing.
Figure 12B:
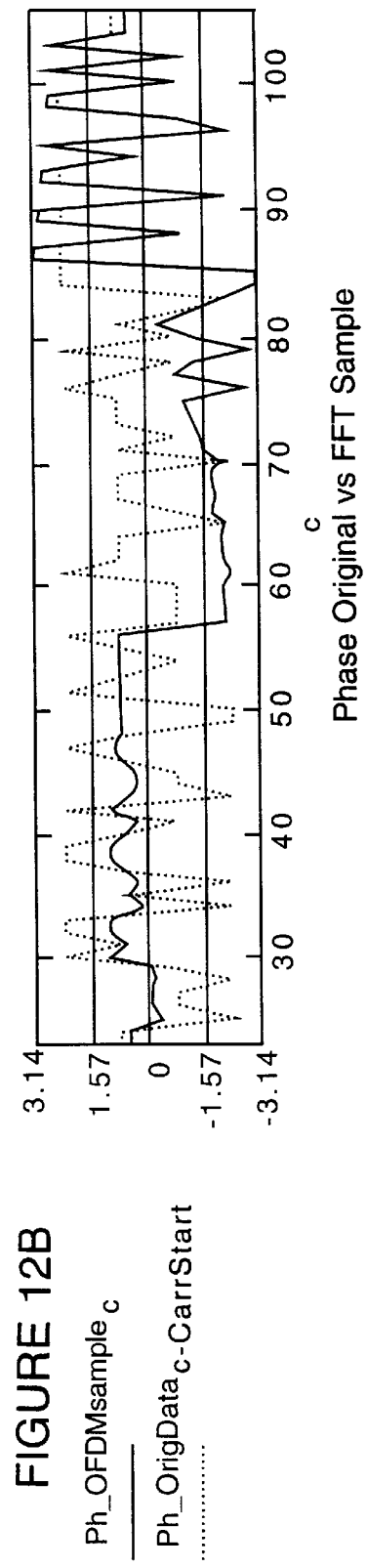
Figure 12C:
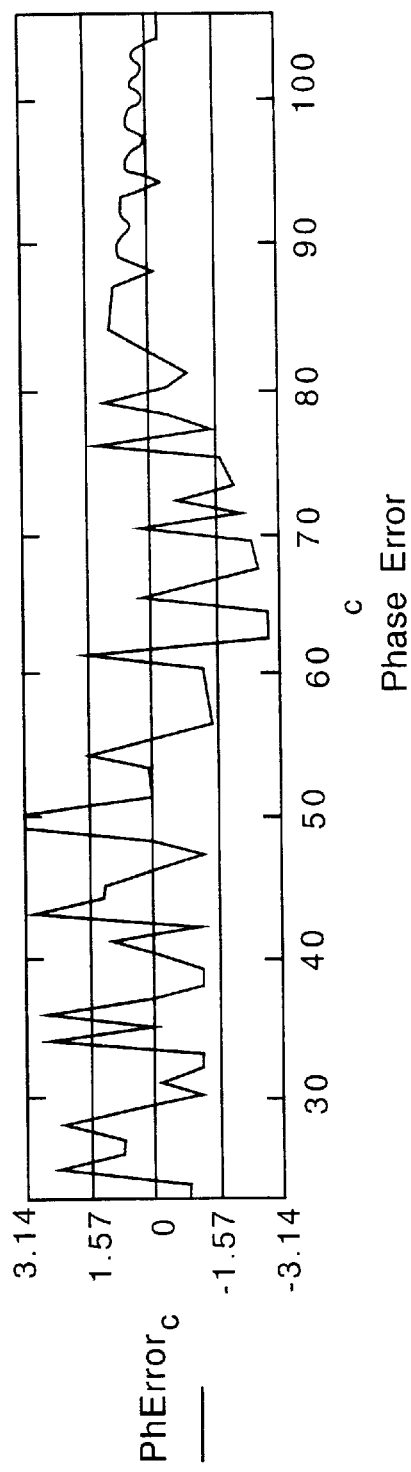

The waveform of FIG. 11 is transformed and demodulated into amplitudes and phases of its 84 carriers. Referring to FIGS. 12A–C, it can be seen that the effects of the jammer are spread across the carrier frequencies for carriers 23–106, but there is not distortion to the amplitudes or phases.

Figure 13A:
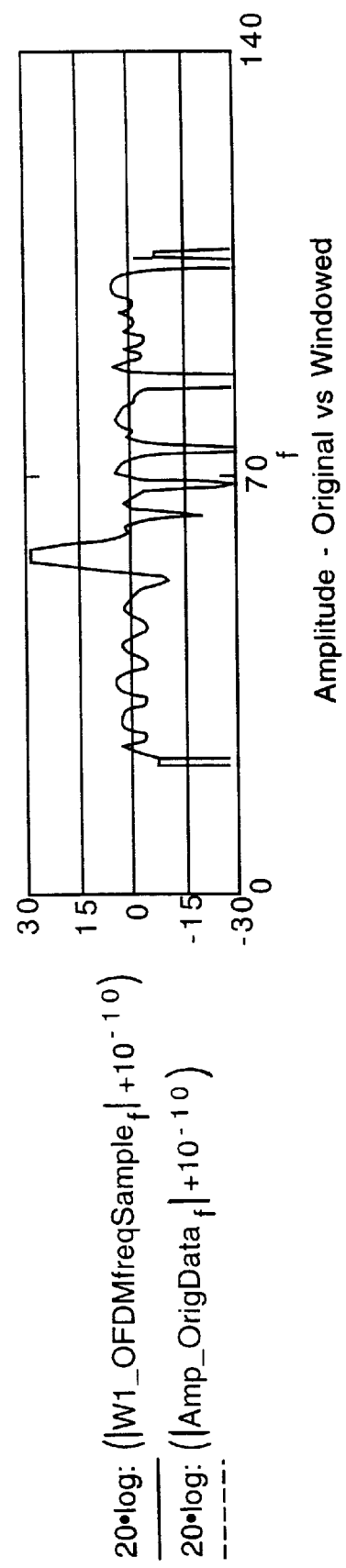
FIGS. 13A–C are illustrations of the phases and amplitudes of the waveform (of FIG. 11) demodulated after applying a Hanning window in the time domain.
Figure 13B:
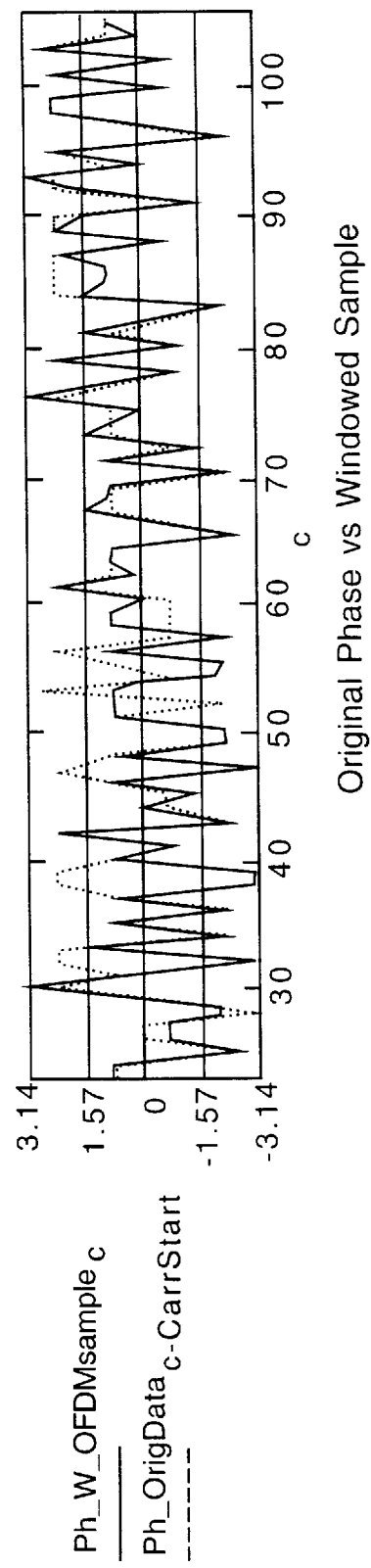
Figure 13C:
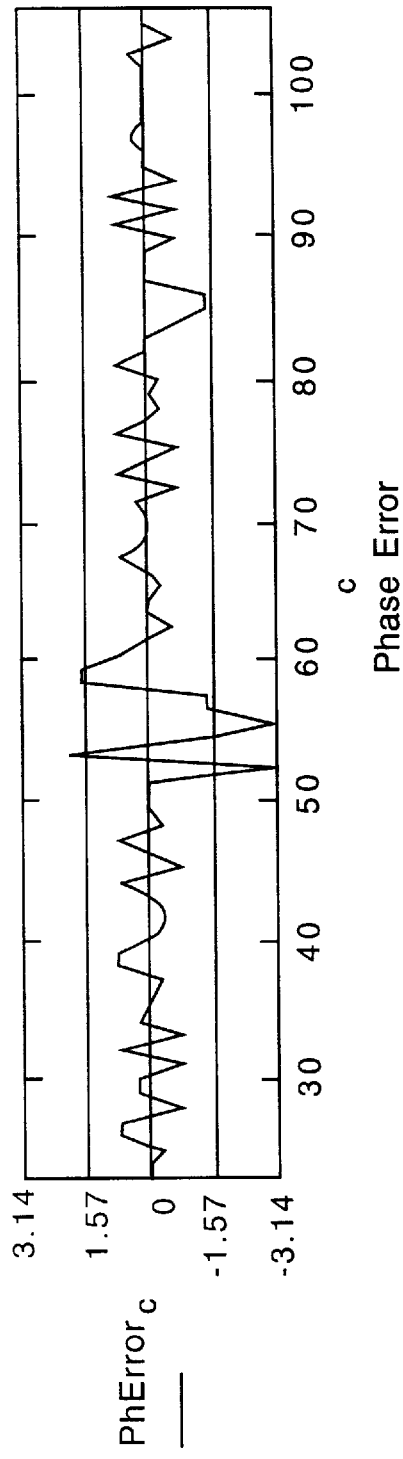

Referring to FIGS. 13A–C, the waveform of FIG. 11 is processed by a Hanning window. It can be seen that the original amplitudes and phases are distorted. Also illustrated in FIG. 13A are frequency nulls, which can sometimes occur with a Hanning window for adjacent carriers of the same amplitude and phase.

Figure 14C:
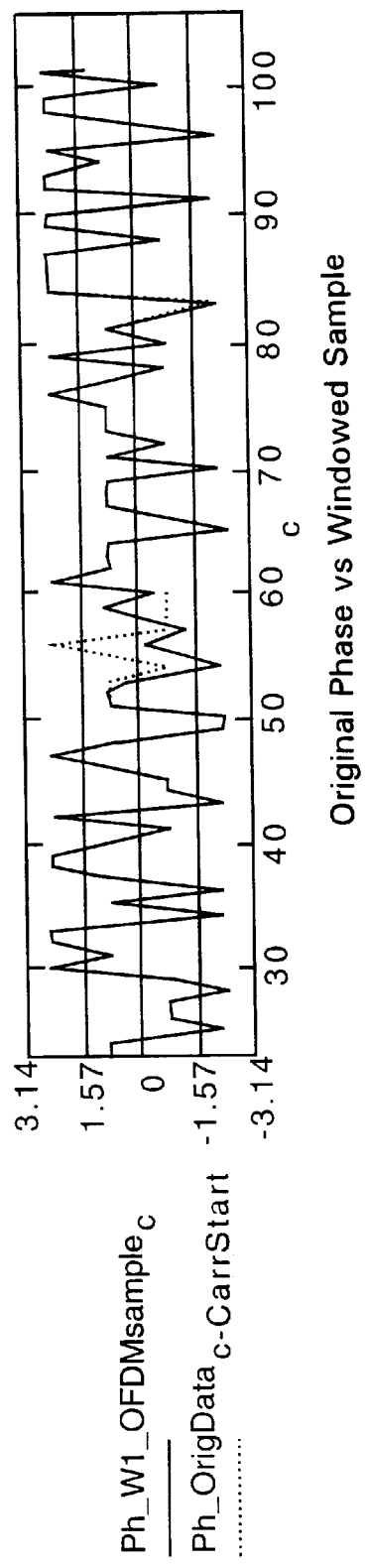
Figure 14D:
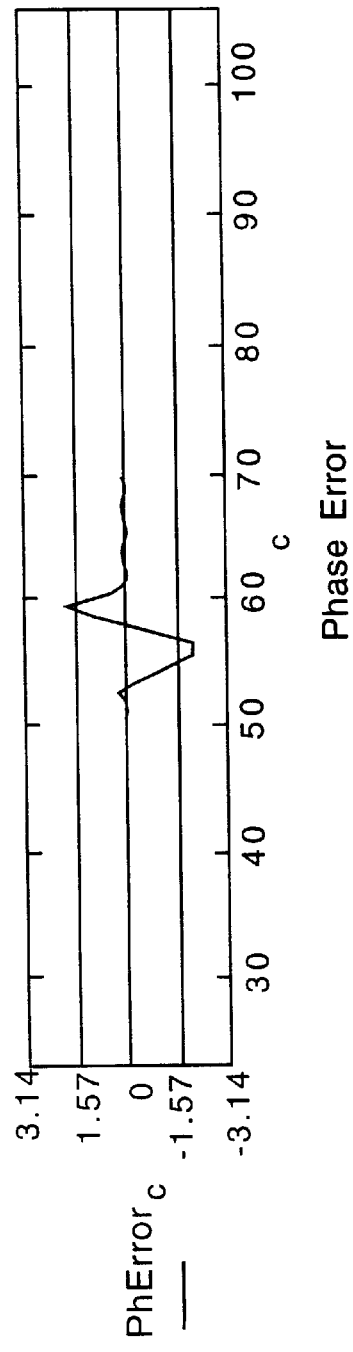

Referring now to FIGS. 14A–D, the same waveform shown in FIG. 11 is processed by the time domain based windowing process described above in reference to FIG. 10. FIG. 14A is an illustration of the time domain based windowing process as applied to the waveform of FIG. 11. FIGS. 14B–D are illustrations of the phases and amplitudes of the waveform demodulated after using the time-domain based windowing process of FIG. 14A. The time domain based windowing technique has eliminated the distortion caused by the Hanning window (as illustrated in FIGS. 13A–C). Referring to FIG. 14B, it can be seen that all but the frequencies closest to the jammer frequency are usable.

Figure 15C:
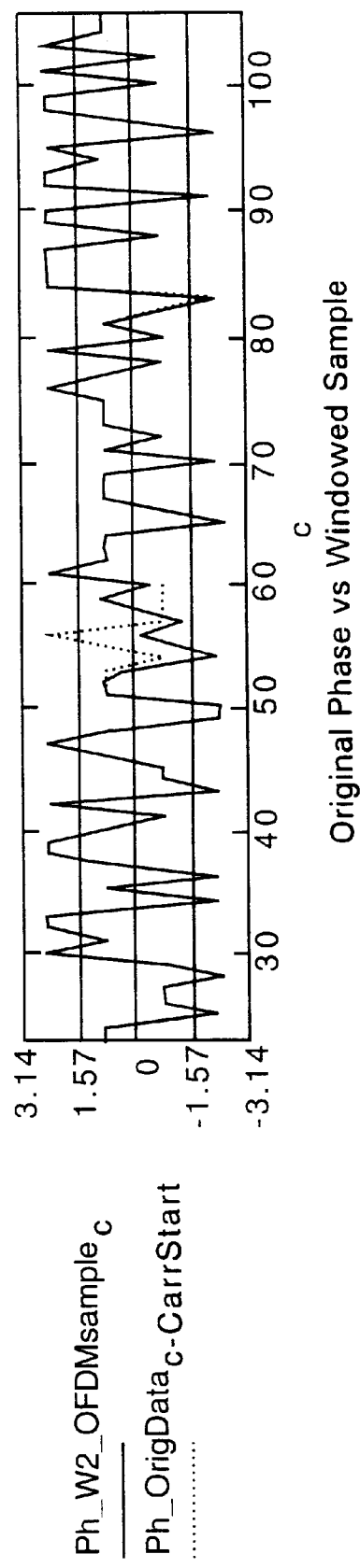
Figure 15D:
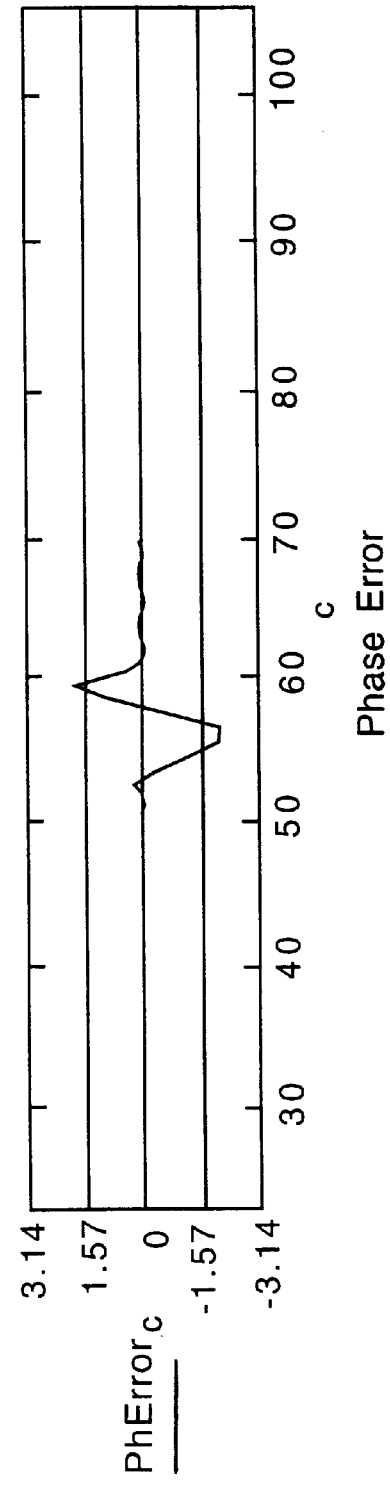

Referring to FIGS. 15A–D, the waveform of FIG. 11 is processed by the frequency domain based windowing process described above in reference to FIG. 7. FIG. 15A is an illustration of the frequency domain based windowing process as it is applied to the waveform of FIG. 11. FIGS. 15B–D are illustrations of the phases and amplitudes of the waveform demodulated after using the frequency domain based windowing process of FIG. 15A. The figures show results which are comparable to those obtained using the time domain based windowing technique.

It will be appreciated by those skilled in the art that the windowing function may be selected as any "symmetric" apodizing window function, that is, an apodizing window function which has the property $W_j+W_{(FFTSize/2+j)}$=constant, where FFTSize is the size of the FFT sample. In the case of the Hanning window, all values of j add up to 1. Thus, the Hanning window has this property. Another example of such a symmetric apodizing window function would be a triangular window.

Other Embodiments

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method of determining phases of a symbol for phase correlating the symbol with a reference, the method comprising:

performing a windowing function on a first symbol sample having a symbol period of T and a second symbol sample time-offset from the first symbol sample by T/2 to produce first windowed values for the first symbol sample and second windowed values for the second symbol sample, the windowing function being a symmetric apodizing window function;

applying a time shift to re-align the second symbol sample with the symbol sample, thereby aligning the second windowed values with corresponding first windowed values;

summing the second windowed values with the corresponding first windowed values; and converting the summed values to phases.

2. The method of claim 1, wherein the symmetric apodizing window function is a Hanning window function.

3. The method of claim 1, wherein performing the windowing function occurs in the time domain.

4. The method of claim 1, wherein performing the windowing function occurs in the frequency domain.

5. The method of claim 4, wherein performing a windowing function includes applying the windowing function to FFT frequency coefficients of the first symbol sample and the second symbol sample.

6. The method of claim 4, further comprising:

transforming the first symbol sample from a time-domain to a frequency domain;

transforming the second symbol sample from a time-domain to a frequency domain;

applying the symmetric apodizing window to the transformed first symbol sample to produce first windowed values; and applying the symmetric apodizing window to the transformed second symbol sample to produce second windowed values.

7. The method of claim 3, further comprising:

applying a half symmetric apodizing window to a second half of the first symbol sample to produce the first windowed values; and applying a half symmetric apodizing window to a first half of the second symbol sample to produce the second windowed values.

8. The method of claim 7, further comprising:

transforming the summed windowed values and a first half of the first symbol sample to frequency values; and converting the frequency values to phases.

9. A phase correlation unit comprising:

a window filter for applying a symmetric apodizing window to a first symbol sample of a symbol having a symbol period T and a second symbol sample offset from the symbol sample by T/2 to produce first windowed values for the first symbol sample and second windowed values for the second symbol sample;

a time shifting element for time-shifting the second windowed values into alignment with the first windowed values;

an adder for adding the second windowed values to the first windowed values to produce summed values;

a converter, coupled to the adder, for receiving the summed values and converting the summed values into phases; and a phase correlator connected to the converter, for performing a phase correlation on the received phases.

10. The phase correlation unit of claim 9, wherein the window filter applies the symmetric apodizing window to the first and second symbol samples in the time domain.

11. The phase correlation unit of claim 10, wherein the window filter applies a first half of the symmetric apodizing window to a second half of the first symbol to produce the first windowed values and a second half of the symmetric apodizing window to a first half of the second symbol sample to the produce second windowed values.

12. The phase correlatio unit of claim 10, wherein the window filter applies the apodizing window to FFT coefficients of the first symbol sample and the second symbol sample in the frequency domain.

13. The phase correlation unit of claim 10, wherein the symmetric apodizing window is a Hanning window.

14. The phase correlation unit of claim 12, wherein the symmetric apodizing window is a Hanning window.

15. The phase correlation unit of claim 13, further comprising:

a Fast Fourier Transform engine to transform the first and second symbol samples to a frequency domain;

wherein the window filter applies the apodizing window to the transformed first symbol sample to produce the first windowed values; and wherein the window filter applies the apodizing window to the transformed second symbol sample to produce the second windowed values.

16. The phase correlation unit of claim 11, wherein the adder outputs the summed window values and a first half of the first symbol sample to a Fast Fourier Transform engine.

* * * * *

UNITED STATES PATENT AND TRADEMARK OFFICE
CERTIFICATE OF CORRECTION

PATENT NO. : 6,074,086
DATED : June 13, 2000
INVENTOR(S) : Lawrence W. Yonge III It is certified that error appears in the above-identified patent and that said Letters Patent is hereby corrected as shown below:

Column 4,
Line 8, "r(t-t.)" should read -- $r(t-t_0)$ --.

Column 5,
Lines 43 and 46, "imaginery" should be -- imaginary --.

Column 6,
Line 12, "FIG. 14" should be -- FIG. 4 --.

Column 10,
Line 13, "correlatio" should be -- correlation --.

Signed and Sealed this

Thirtieth Day of October, 2001

Attest:

NICHOLAS P. GODICI
Attesting Officer
Acting Director of the United States Patent and Trademark Office